United States Patent
Davenport et al.

(10) Patent No.: US 12,549,259 B2
(45) Date of Patent: *Feb. 10, 2026

(54) PHOTONIC INTEGRATED CIRCUIT FOR HIGH-WAVELENGTH-CHANNEL-COUNT WAVELENGTH-DIVISION-MULTIPLEXED SYSTEMS

(71) Applicant: Quintessent Inc., Goleta, CA (US)

(72) Inventors: Michael Davenport, Santa Barbara, CA (US); Brian Koch, Santa Barbara, CA (US); Alan Liu, Santa Barbara, CA (US)

(73) Assignee: Quintessent Inc., Goleta, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/217,956

(22) Filed: Jul. 3, 2023

(65) Prior Publication Data
US 2023/0353251 A1 Nov. 2, 2023

Related U.S. Application Data

(63) Continuation of application No. 18/098,568, filed on Jan. 18, 2023.
(Continued)

(51) Int. Cl.
*H04J 14/02* (2006.01)
*H04B 10/40* (2013.01)
(Continued)

(52) U.S. Cl.
CPC ........ *H04B 10/572* (2013.01); *H04B 10/40* (2013.01); *H04B 10/503* (2013.01); *H04B 10/6151* (2013.01); *H04J 14/0307* (2023.08)

(58) Field of Classification Search
CPC ..... H04J 14/02; H04B 10/40; H04B 10/2507; H04B 10/572; H04B 10/503;
(Continued)

(56) References Cited

U.S. PATENT DOCUMENTS 7,221,820 B2 * 5/2007 Boertjes .............. H04J 14/0209
398/43
8,620,164 B2 12/2013 Heck et al.
(Continued)

OTHER PUBLICATIONS

Michael Davenport et al., Unpublished Patent Application entitled "Windowed Sampled Grating and Method of Fabrication", U.S. Appl. No. 17/465,403, filed Sep. 2, 2021.
(Continued)

*Primary Examiner* — Hanh Phan
(74) *Attorney, Agent, or Firm* — Kaplan Breyer Schwarz LLP

(57) ABSTRACT

The present disclosure is directed toward architectures that combine DWDM and CWDM concepts in a single PIC. Transmitter stages in accordance with the present disclosure include a plurality of multiwavelength lasers having regions of separately grown epitaxial material whose gain peaks are centered at different wavelengths. Each laser launches a wavelength comb comprising a plurality of wavelength signals into a PLC, where the wavelengths within each wavelength comb are separated by a wavelength spacing that is smaller than that between adjacent wavelength combs. In some embodiments, the PLC includes modulator banks for encoding data on the wavelength signals and combining them to produce a composite DWDM output signal. In some embodiments, a receiver stage is included for demultiplexing a composite DWDM input signal and detecting each wavelength channel within it. In some embodiments, the receiver stage employs polarization-diversity techniques to enable it to operate on unpolarized/randomly polarized input signals.

34 Claims, 9 Drawing Sheets

Related U.S. Application Data

(60) Provisional application No. 63/356,826, filed on Jun. 29, 2022, provisional application No. 63/300,516, filed on Jan. 18, 2022.

(51) Int. Cl.
*H04B 10/50* (2013.01)
*H04B 10/572* (2013.01)
*H04B 10/61* (2013.01)

(58) Field of Classification Search
CPC  H04B 10/6151; H04B 10/548; H04B 10/516; G02B 6/4246; G02B 6/4215; G02B 6/29355; H04Q 11/0067; H04Q 11/0066; H04Q 11/0003; H04Q 11/0005
USPC ... 398/79, 82, 135, 136, 137, 138, 139, 158, 398/159, 183, 188, 186, 187, 193, 194, 398/196, 91, 96, 33, 38, 45, 46, 47, 48, 398/49, 54, 55, 56, 57; 385/24, 37, 16, 385/17, 18, 14; 372/20, 96, 102
See application file for complete search history.

(56) References Cited

U.S. PATENT DOCUMENTS

| | | | |
|---|---|---|---|
| 8,705,972 B2* | 4/2014 | McLaren | G02B 6/12007 398/139 |
| 8,792,788 B2* | 7/2014 | Lam | H04J 14/0279 398/91 |
| 8,830,033 B1 | 9/2014 | Duxbury et al. | |
| 9,097,848 B2 | 8/2015 | Bowers | |
| 9,525,490 B2* | 12/2016 | Koch | H04B 10/503 |
| 9,910,120 B2 | 3/2018 | Grodzki | |
| 10,727,640 B2 | 7/2020 | Sun et al. | |
| 2010/0054741 A1* | 3/2010 | Urino | H04J 14/0227 398/79 |
| 2018/0294622 A1* | 10/2018 | Kurczveil | H01S 5/1032 |
| 2021/0359766 A1* | 11/2021 | Sysak | H04B 10/506 |
| 2024/0007192 A1* | 1/2024 | Davenport | H04B 10/506 |

OTHER PUBLICATIONS

Chris Cole, Beyond 100G client optics, Feb. 9, 2012, IEEE Communications Magazine, pp. s58-s66, vol. 50/No. 2.

Folkert Horst et al., "Cascaded Mach-Zehnder wavelength fillers in silicon photonics for low loss and flat pass-band WDM (de-)multiplexing," "Optics Express", May 6, 2013, Optical Society of America, pp. 11652-11658, vol. 21, Issue 10, https://doi.org/10.1364/0E.21.011652.

Michael Davenport et al., Related Unpublished Patent Application entitled "Windowed Sampled Grating and Method of Fabrication", U.S. Appl. No. 17/465,403, filed Sep. 2, 2021.

Non-Final Rejection Mailed on Dec. 5, 2024 for U.S. Appl. No. 18/098,568, 21 page(s).

Non-Final Rejection Mailed on Aug. 14, 2024 for U.S. Appl. No. 18/098,568, 12 page(s).

* cited by examiner

FIG. 4  Transceiver 400

PHOTONIC INTEGRATED CIRCUIT FOR HIGH-WAVELENGTH-CHANNEL-COUNT WAVELENGTH-DIVISION-MULTIPLEXED SYSTEMS

CROSS REFERENCE TO RELATED APPLICATIONS

This application is a continuation of co-pending U.S. Non-provisional patent application Ser. No. 18/098,568, filed Jan. 18, 2023, which claims the benefit of U.S. Provisional Application Ser. No. 63/300,516, filed Jan. 18, 2022, entitled "Photonic Integrated Circuit for High-Channel-Count Wavelength-Division-Multiplexed Systems," and U.S. Provisional Application Ser. No. 63/356,826, filed Jun. 29, 2022, entitled "Photonic Integrated Circuit for High-Channel-Count Wavelength-Division-Multiplexed Systems," each of which is incorporated herein by reference. If there are any contradictions or inconsistencies in language between the instant application and one or more of the cases that have been incorporated by reference that might affect the interpretation of the claims in this case, the claims in the instant application should be interpreted to be consistent with the language in the instant application.

TECHNICAL FIELD

The present disclosure relates to photonic integrated circuits in general, and, more particularly, to photonic integrated circuits for use in wavelength-division-multiplexed systems.

BACKGROUND

Designing an optical link and the supporting devices to substantially optimize the total bandwidth, bandwidth per fiber, linear bandwidth density, areal bandwidth density, energy efficiency, and other factors is a key challenge for optical transceivers used in telecom, datacom, and artificial-intelligence (AI)/machine learning systems, among other applications.

Presently, such systems tend to utilize dense-wavelength-division multiplexing (DWDM) wherein adjacent wavelength channels are separated by up to 800 GHz (equal to a wavelength-channel spacing of 6.4 nm), or coarse-wavelength-division-multiplexing (CWDM) having a wavelength-channel spacing of 20 nm, to increase the attainable aggregate link bandwidth by adding more wavelength channels, each at a different wavelength and/or on different optical fibers. As will be appreciated by one skilled in the art, however, there is constant pressure to increase the aggregate bandwidth of these systems to satisfy an ever-growing demand for information-carrying capacity.

DWDM advantages include more spectrally efficient links, as well as the ability to employ lasers and other devices that might have limited spectral bandwidth. DWDM also enables the use of novel wavelength-dependent devices, such as ring-resonator-based modulators/filters that have repeat modes located several nm away from the intended spectral location. Unfortunately, DWDM requires wavelength-selective filters that are more difficult to design and fabricate. Furthermore, in practice, the number of DWDM wavelengths that can be reasonably combined in a photonic integrated circuit (PIC) is limited by the ability to generate the wavelength signals efficiently with enough power and the ability to modulate and route (mux/demux) the many signals with sufficiently low loss.

CWDM advantages include a tolerance for wavelength drift for light sources (due to, for example, fabrication imperfections, temperature variations, etc.) even if the multiplexing and demultiplexing filters remain fixed and have separately optimized lasers and other devices for each wavelength band. However, the spectral density of a CWDM system is limited.

Prior-art attempts to increase the aggregate data bandwidth per fiber of DWDM and CWDM systems have been generally directed toward either increasing the data rate on each wavelength channel or increasing the number of wavelength channels used. Attempts to increase the number of wavelength channels have typically been directed toward expanding the total spectral width of the system or increasing the spectral density of the wavelength channels.

Unfortunately, increasing the wavelength-channel count requires larger and more complex multiplexing and demultiplexing elements, such as arrayed waveguide gratings (AWG) or ring-resonator-based filters. However, as the wavelength-channel count increases and bandwidth becomes large, such devices become harder to design and fabricate and their optical loss increases. Furthermore, filters like AWG are difficult, if not impossible, to stabilize with changing temperature.

A ring-resonator-based spectral filter or modulator comprises multiple ring resonator elements, each optically coupled to a common bus waveguide for light of a different wavelength. To increase the number of wavelength channels on which the modulator/filter operates, additional ring-resonator elements configured for other wavelengths of light are coupled to the bus waveguide. Unfortunately, this requires a tradeoff between increasing the total spectral bandwidth of the array of ring resonators, or increasing the spectral density of the wavelength channels. A wider spectral bandwidth for the modulator/filter array requires laser sources capable of providing signals over the wider span, which can be difficult, if not impossible, due to limited gain-bandwidth of lasers and/or the limited nonlinearity of alternative laser source solutions. This is especially true for laser sources integrated on a photonic circuit. A wider spectral bandwidth for the modulator/filter array also requires that each ring resonator modulator/filter has a larger free spectral range (FSR) so that the repeat wavelengths of each ring resonator does not overlap with the wavelength of any other ring resonator. The larger ring resonator FSR requires smaller ring radii which eventually become difficult or impossible to fabricate. On the other hand, higher spectral density can limit the modulation bandwidth of each wavelength channel and/or result in crosstalk between the adjacent wavelength channels.

Furthermore, as the number of modulators/filters coupled to a bus waveguide increases, the pass-through loss at each ring resonator not optically coupled with the bus waveguide becomes significant, making it difficult to close a data link. In addition, such approaches can add significant crosstalk to each wavelength channel, increasing the difficulty of separating individual wavelength channels at a receiver.

To attempt to mitigate these issues, spectral interleavers and de-interleavers have been used to separate every other wavelength to a different serial bus waveguide. As a result, each data signal (wavelength channel) incurs loss from only half as many ring modulators (Tx) or ring filters (demux) and crosstalk between adjacent wavelength channels is reduced. Unfortunately, this requires a broadband laser source that covers the entire desired wavelength range. In addition, interleavers and de-interleavers must have substantially flat passbands to mitigate distortion of the data signals, which adds complexity to their design.

The need for a simple, practical approach for realizing dense high-wavelength-channel-count wavelength-division-multiplexed systems with ring resonators remains, as yet, unmet in the prior-art.

SUMMARY

The present disclosure is directed to components for end-to-end communications links having high wavelength-channel counts and very high aggregate bandwidth, which are enabled by exploiting the advantages provided by both DWDM and CWDM concepts in a combined architecture. Embodiments in accordance with the present disclosure are particularly well suited for use in applications such as optical telecommunications, optical data communications, dense computer communications fabrics, artificial-intelligence/machine-learning (AI/ML) computing clusters, optical interconnects in datacenters, and the like.

An advance over the prior art is realized by employing architectures that combine DWDM and CWDM concepts in a single photonic integrated circuit, thereby exploiting the strengths of both approaches and realizing larger aggregate bandwidth than can be realized in the prior art. This allows for high total bandwidth-per-fiber while simultaneously enabling sufficient wavelength spacing between adjacent wavelengths (i.e., "wavelength-channel spacing") for high-speed modulation and multiplexing without significant crosstalk. Embodiments in accordance with the present disclosure include a transmitter section comprising multiple signal-generator sections, each of which produces a different band of DWDM wavelength channels. These wavelength-channel bands are separated by coarse wavelength spacings that are substantially larger than the DWDM wavelength-channel spacing within them. The multiple wavelength-channel bands are then combined in a WDM combiner to produce a composite multi-band DWDM output signal.

In some embodiments, the PIC also includes a receiver section that includes a coarse wavelength-signal-band demultiplexer, which can receive a composite multi-band DWDM signal and separate it into a plurality of coarsely spaced wavelength-channel bands, each of which is then provided to a separate DWDM detection section where each individual wavelength channel in that wavelength-channel band is converted into a commensurate electrical signal.

An illustrative embodiment is a PIC-based transceiver having a transmitter section and a receiver section disposed on a common substrate. The transmitter section includes four transmitter cores, each of which comprises a hybrid-integrated multiwavelength laser that is optically coupled with a modulator bank comprising a bus waveguide and eight ring-resonator-based modulators, each configured to imprint data on a different wavelength signal propagating through its respective bus waveguide to produce a wavelength channel.

Each multiwavelength laser comprises a region of separately grown epitaxial material having a gain peak centered at a different wavelength, which are separated by 20 nm. The multiple regions of epitaxial material are bonded to the substrate and subsequently processed to form four lasers, each disposed on and optically coupled with a bus waveguide of a different modulator bank previously formed on the substrate. In some embodiments, two or more multi-wavelength lasers may be formed from the same epitaxial material. In some embodiments, each of one or more individual lasers is configured to emit a plurality of wavelength combs. Each laser launches a wavelength comb comprising a plurality of wavelength signals into the bus waveguide of its respective modulator bank, where adjacent wavelength combs are separated by a wavelength spacing of 20 nm, center to center. As the wavelength signals of a wavelength comb propagates through the bus waveguide of its respective modulator bank, the modulators of that modulator bank can imprint data on them to produce a wavelength-channel band comprising a plurality of wavelength channels.

As a result, the transmitter cores provide four wavelength-channel bands having a band spacing of 20 nm center to center, each wavelength-channel band including a wavelength comb having eight DWDM wavelength channels that are spaced apart by 200 GHz (i.e., 0.8 nm in the O-band). In other words, the transmitter section of the illustrative embodiment provides four CWDM bands, each band containing eight DWDM wavelength channels. In some embodiments, a transmitter section provides multiple wavelength-channel bands having band spacing other than 20 nm but still substantially greater than the DWDM wavelength-channel spacing within each wavelength-channel band.

The wavelength-channel bands are provided to a CWDM multiplexer stage having a two-stage cascaded asymmetric Mach-Zehnder Interferometer (aMZI) arrangement that combines the thirty-two DWDM signals into a composite DWDM output signal that can then be coupled into an output optical fiber or other suitable component, such as an integrated-optics waveguide, detector, photonic integrated circuit (PIC), and the like. In some embodiments, a different combiner (e.g., a simple power combiner, contra-directional-filter-based coupler, series of contra-directional-filter-based couplers, etc.) is used to combine the DWDM signals into the composite DWDM output signal.

The receiver section comprises a polarization splitter and rotation stage, a pair of substantially identical demultiplexer paths, and four photodetector arrays. The receiver is configured such that a composite DWDM input signal received at its input port is split into its TE- and TM-polarization modes at the polarization splitter and rotation stage. The TM-polarized light is rotated by the rotation stage to form a second TE-polarized signal, and each TE-polarized portion is then routed to a different one of the demultiplexer paths. Each demultiplexer path includes a CWDM demultiplexer comprising cascaded aMZI stages that separates its respective TE-polarized signal into four wavelength-signal sets. Each wavelength-signal set is provided to a different DWDM demultiplexer filter bank comprising eight ring-resonator spectral filters configured to demultiplex the DWDM signals in the wavelength-signal set received by that filter bank. In some embodiments, polarization and rotation is performed after composite DWDM input signal passes through the CWDM demultiplexer.

Corresponding DWDM signals from each of the demultiplexer paths are combined at each photodetector of the photodetector arrays, which detects each combined DWDM signal and provides a commensurate electrical output signal.

In some embodiments, the free spectral range (FSR) of the ring-resonator data modulators and/or demultiplexers is chosen such that the repeat modes of the rings do not fall within the expected passband of some, or any, of the other CWDM wavelength-channel passbands, in order to further reduce crosstalk.

In some embodiments, a plurality of multiwavelength lasers, each providing a different wavelength comb, is optically coupled with a star coupler having multiple output ports to define a transmitter section that functions as a multi-signal source. Each output signal of the transmitter section is an aggregate output signal that includes a substantially equal portion of the optical energy of every wavelength signal provided by the plurality of lasers.

In some of these embodiments, a transmitter is defined by coupling each output signal of a transmitter section that functions as a multi-signal source with a bank of modulators configured to imprint data on at least one wavelength signal included in that output signal to produce at least one wavelength channel. In some of these embodiments, the aggregate wavelengths of all the multiwavelength lasers are DWDM wavelength-channels (i.e., each output signal is a DWDM signal). In some embodiments, at least one semiconductor optical amplifier is used to offset the optical power reduction caused by the splitting of the wavelength channels into the output ports of the star coupler.

In some embodiments in which a transmitter section functions as a multi-signal source, the wavelength combs in each output signal of the star coupler are separated by a demultiplexer and provided to a modulator-bank array having a different modulator bank configured for each wavelength band. In some such embodiments, the modulated wavelength combs associated with each demultiplexer are recombined by a multiplexer to form a composite DWDM output signal that can then be coupled into an output optical fiber or other suitable component, such as an integrated-optics waveguide, detector, photonic integrated circuit (PIC), and the like.

In some embodiments in which a transmitter section functions as a multi-signal source, the wavelength signals in the wavelength combs of each output signal of the star coupler are distributed to different modulator banks by an even-odd de-interleaver whose output signals are routed to different modulator banks. In some such embodiments, the modulated wavelength combs (i.e., wavelength-channel bands) associated with each de-interleaver are recombined by a multiplexer to form a composite DWDM output signal that can then be coupled into an output optical fiber or other suitable component, such as an integrated-optics waveguide, detector, photonic integrated circuit (PIC), and the like.

In some embodiments, an output port of at least one aMZI routes light to a monitor photodiode that provides a control signal used to control spectral alignment of the aMZI.

In some embodiments, at least one ring-resonator data modulator imprints a dither signal on its corresponding DWDM wavelength channel to facilitate proper spectral alignment of the multiplexer.

In some embodiments, a dither signal is used to enable differentiation of detected signals at the photodiodes.

In some embodiments, at least one of the multiplexer and/or one of the demultiplexer paths includes a CWDM filter that employs at least one of a ring-assisted aMZI approach, an Echelle grating, a contra-directional filter, and an arrayed waveguide grating (AWG).

In some embodiments, at least one of the multiwavelength lasers is replaced by an array of single-wavelength lasers.

An embodiment in accordance with the present disclosure is an apparatus comprising first photonic-integrated circuit (PIC) comprising a transmitter section disposed on a first substrate, the transmitter section including: a signal-generation stage (SGS) for providing a first plurality of light signals, the SGS including a plurality of N lasers for providing a first plurality of wavelength combs, each wavelength comb of the first plurality thereof encompassing a different spectral range and including a plurality of M wavelength signals that are separated by a first wavelength spacing, wherein the wavelength combs of the first plurality thereof are separated by a second wavelength spacing that is greater than the first wavelength spacing, and wherein each light signal of the first plurality thereof is based on a different wavelength comb of the first plurality of wavelength combs; and a first planar-lightwave circuit (PLC) comprising a first optical element that is optically coupled with the SGS such that the first optical element receives the first plurality of light signals from the plurality of lasers and provides at least one composite output signal comprising N*M output signals that are based on the first plurality of wavelength combs.

Another embodiment in accordance with the present disclosure is a method comprising: providing a first substrate comprising a first planar-lightwave circuit (PLC) that includes a first optical element having a first plurality of input ports and at least one output port; and providing a signal-generation stage (SGS) that includes a plurality of N lasers disposed on the substrate such that each laser is optically coupled with a different input port of the plurality thereof and configured to provide a different wavelength comb of a first plurality of N wavelength combs, each wavelength comb of the first plurality thereof encompassing a different spectral range and including a plurality of M wavelength signals that are separated by a first wavelength spacing, wherein the wavelength combs of the first plurality thereof are separated by a second wavelength spacing that is greater than the first wavelength spacing; wherein the first optical element and the plurality of lasers are arranged such that each input port receives a light signal based on a different wavelength comb of the plurality thereof; and wherein the first optical element is configured to provide at least one composite output signal at the at least one output port, the at least one composite output signal comprising N*M output signals that are based on the first plurality of wavelength combs.

DETAILED DESCRIPTION

Figure 1:
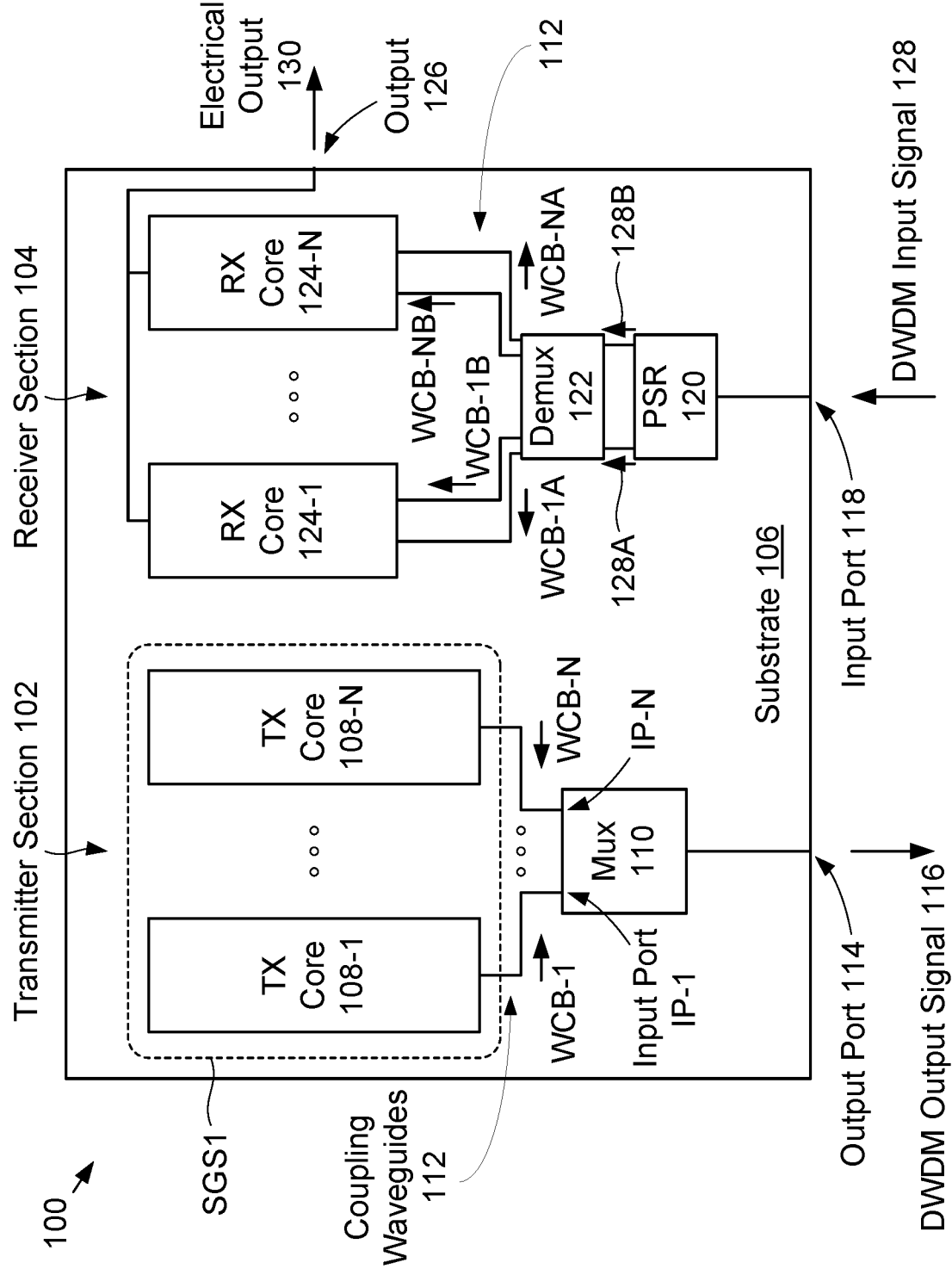
FIG. 1 depicts a block drawing of a transceiver in accordance with the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks that may be labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the figures comprising the drawing are not drawn to scale.

The following terms are defined for use in this Specification, including the appended claims:

"wavelength spacing" is defined as the spectral separation between adjacent elements of any group of spectral components, such as adjacent wavelength combs, wavelength-channel bands, wavelength signals within a wavelength comb, wavelength channels within a wavelength-channel band, and the like.

"wavelength-channel spacing" is defined as the spectral separation between adjacent wavelength channels within a wavelength-channel band or in a DWDM signal; and "band spacing" is defined as the center-center spectral separation between adjacent wavelength combs or wavelength-channel bands.

FIG. 1 depicts a block drawing of a transceiver in accordance with the present disclosure. Transceiver 100 comprises transmitter section 102 and receiver section 104, which are integrated on common substrate 106. Transceiver 100 is configured to send and receive wavelength channels for which an optical WDM system operates, where the wavelength channels are contained in N wavelength-channel bands, each containing M wavelength channels, where N and M have any practical values. In some embodiments, the N wavelength-channel bands are aligned with the standard CWDM ITU grid. In some embodiments, the M wavelength channels within at least one of the wavelength-channel bands is aligned with the standard DWDM ITU grid. In some embodiments one or more of the N wavelength-channel bands may contain fewer than or more than M wavelength channels (e.g., M−1, M+1, etc.).

In the depicted example, substrate 106 is a conventional silicon-on-insulator substrate comprising a silicon device layer disposed on a buried oxide layer disposed on a silicon handle substrate; however, myriad substrates are suitable for use in accordance with the present disclosure, such as, without limitation, glass substrates, compound-semiconductor substrates, germanium substrates, bulk silicon substrates, and the like.

Transmitter section 102 is a first photonic integrated circuit (PIC) comprising transmitter (TX) cores 108-1 through 108-N, multiplexer (MUX) 110, and output port 114.

TX cores 108-1 through 108-N(referred to, collectively, as TX cores 108) collectively define signal-generation stages SGS1, which provides a plurality of light signals to MUX 110. In the depicted example, these light signals are wavelength-channel bands WCB-1 through WCB-N, respectively, where each of WCB-1 through WCB-N includes a plurality of wavelength channels that are spectrally separated by standard DWDM channel spacing. Furthermore, wavelength-channel bands WCB-1 through WCB-N are spectrally separated from one another by a band spacing that is greater than the standard DWDM wavelength-channel spacing. In some embodiments, wavelength-channel bands WCB-1 through WCB-N are spaced according to the standard CWDM ITU grid. In some embodiments, the wavelength channels within at least one of wavelength-channel bands WCB-1 through WCB-N are spaced according to the standard DWDM ITU grid. In some embodiments, one or more of the wavelength-channel bands WCB-1 through WCB-N are spaced differently from other wavelength-channel bands. In some embodiments, the wavelength channels within at least one of wavelength-channel bands WCB-1 through WCB-N are not all spaced evenly.

Figure 2:
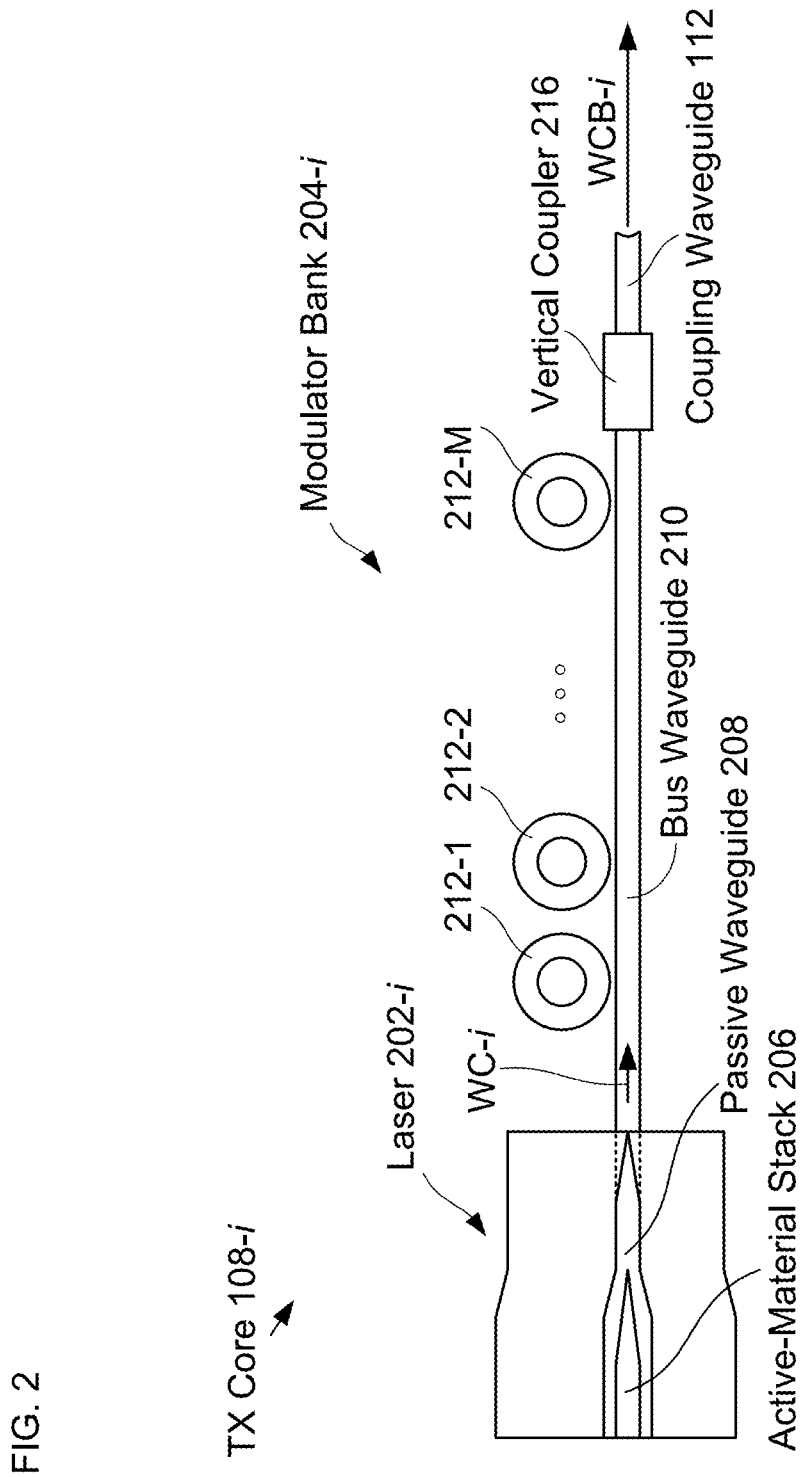
FIG. 2 depicts a schematic drawing of a representative transmitter core in accordance with the present disclosure.

FIG. 2 depicts a schematic drawing of a representative transmitter core in accordance with the present disclosure. TX core 108-$i$, where i=1 through N, comprises laser 202-$i$ and modulator bank 204-$i$, which collectively produce a light signal that includes the wavelength channels of wavelength-channel band WCB-i. TX core 108-$i$ and wavelength-channel band WCB-i are representative of each of TX cores 108-1 through 108-N and WCB-1 through WCB-N, respectively. As will be apparent to one skilled in the art, after reading this Specification, a typical TX core in accordance with the present disclosure includes additional components that enable its operation, such as analog-to-digital converters, digital-to-analog converters, modulator drivers, clock circuitry, heater drivers, control circuitry, and the like;

however, for clarity purposes, these are not shown in FIG. 2. Furthermore, in some embodiments, at least two of TX cores 108-1 through 108-N provide different numbers of wavelength signals. For example, in some embodiments, at least one of TX cores 108-1 through 108-N provides at least one additional wavelength signal for use in communicating additional signals, such as a clock, control signals, and the like.

Laser 202-$i$ is a multiwavelength laser configured to produce wavelength comb WC-$i$, which includes M discrete wavelength signals (i.e., a "comb" of wavelength signals). In the depicted example, the wavelength signals within wavelength comb WC-$i$ have uniform wavelength spacing. In some embodiments, however, the wavelength signals within a wavelength comb are not evenly spectrally spaced.

Laser 202-$i$ comprises active-material stack 206 and passive waveguide 208, which are disposed on substrate 106. Active-material stack 206 comprises a gain structure (e.g., a gain layer comprising quantum elements, etc.) that has a gain peak located in the center of the spectral range of the wavelength-channel band provided by its respective TX core. Passive waveguide 208 is a compound-semiconductor waveguide suitable for guiding light, as well as facilitating bonding of the active material to substrate 106.

In the depicted example, laser 202-$i$ is a heterogeneously integrated laser formed on substrate 106. Heterogeneous integration techniques suitable for use in accordance with the present disclosure are described in, for example, U.S. Pat. Nos. 9,097,848, 9,910,120, 8,830,033, 8,620,164, each of which is incorporated herein by reference in their entirety.

In some embodiments, laser 202-$i$ is fabricated prior to being integrated onto substrate 106 using known hybrid-integration techniques, such as die-to-wafer bonding, transfer printing, flip-chip bonding, and the like. The use of die-to-wafer bonding, transfer printing, or flip-chip bonding techniques to add prefabricated lasers to substrate 106 can enable each laser to be separately optimized in terms of material and design for the specific wavelength band it provides.

In some embodiments, laser 202-$i$ is a mode-locked laser. Examples of mode-locked lasers suitable for use in accordance with the present disclosure are described in U.S. Non-provisional patent application Ser. No. 17/465,403, filed Sep. 2, 2021, and U.S. Provisional Patent Application No. 63/082,760, filed Sep. 24, 2020, each of which is incorporated herein by reference in their entirety. In some embodiments, laser 202-$i$ is a different mode-locked laser. In some embodiments, laser 202-$i$ has a different conventional multiwavelength laser design. In some embodiments, an array of single-wavelength lasers is used to generate the wavelength signals of wavelength comb WC-$i$.

Modulator bank 204-$i$ is a planar-lightwave circuit (PLC) that includes bus waveguide 210 and ring waveguides 212-1 through 212-M (referred to, collectively, as ring waveguides 212), all of which are formed on substrate 106 via conventional integrated-optics processing techniques. Preferably, each of the bus waveguide and ring waveguides is a silicon-core waveguide. Typically, bus waveguide 210 and ring waveguides 212 are formed by patterning the silicon device layer of substrate 106 in conventional fashion.

Each of ring waveguides 212 is optically coupled with bus waveguide 210 to define a ring-resonator-based data modulator that is configured to encode data onto a different wavelength signal of wavelength comb WC-$i$, thereby collectively generating a light signal that includes the M wavelength channels in wavelength-channel band WCB-$i$ provided by TX core 108-$i$. In some embodiments, ring waveguides 212 include p-n junction modulators. In some embodiments, the light propagating in at least one of ring waveguides 212 is modulated using a different type of modulator. In some embodiments, the order of ring waveguides 212-1 through 212-M may be different and may be non-sequential, meaning that the wavelengths entering the rings may not be increasing or decreasing or sequential with respect to ring position along the bus waveguide.

It should be noted that, although the ring-resonator-based data modulators described above include only one ring, in some embodiments two or more coupled ring waveguides are used to define a modulating or demultiplexing filter shape that, for example, does not distort the data encoded on the optical wavelengths.

It is another aspect of the present disclosure that the ring-resonator-based data modulators of TX core 108 (and/or the ring-resonator spectral filters of RX core 124, as discussed below) can be designed with a free spectral range (FSR) such that the repeat modes of the ring waveguides do not fall within the expected passband of some or any of the other CWDM wavelength-channel passbands, in order to further reduce crosstalk. In fact, using such an approach, the use of CWDM demultiplexers in receiver section 104 can be completely avoided.

In some embodiments, laser 202-$i$ is optically coupled with bus waveguide 210 via passive waveguide 208. In some embodiments, the passive waveguide is disposed directly on bus waveguide 210 such that they collectively define a composite waveguide. In some embodiments, a vertical coupler is included in TX core 108-$i$ to optically couple the passive waveguide and the bus waveguide. In some embodiments, the active-material stack of laser 202-$i$ is disposed directly on bus waveguide 210.

Bus waveguide 210 is optically coupled with coupling waveguide 112 at conventional vertical coupler 216.

Preferably, coupling waveguide 112 comprises a thin silicon-nitride core surrounded by silicon dioxide, whereby the majority of the optical mode exists in the silicon dioxide. In the depicted example, coupling waveguide 112 includes a silicon-nitride core having a thickness within the range of approximately 110 nm to approximately 250 nm and surrounding silicon-dioxide layers having a thickness within the range of approximately 1000 nm to approximately 5000 nm; however, any suitable waveguide type and/or thickness can be used in coupling waveguide 112 without departing from the scope of the present disclosure. For example, in some embodiments, a waveguide has a silicon-nitride core having a thickness within the range of approximately 40 nm to approximately 800 nm and/or surrounding silicon-dioxide layers having a thickness within the range of approximately 200 nm to approximately 1500 nm.

It is an aspect of the present disclosure that employing multiple, individually tailored lasers integrated onto a PIC, each optically coupled with a different bus waveguide and series of ring-resonator modulators affords significant benefits over prior-art systems in which a single laser is used to provide all desired wavelengths on a single bus waveguide, including:

i. enabling the use of multiwavelength lasers having smaller total wavelength count requirements; or
ii. overcoming optical bandwidth limitations of any single (multi-wavelength) laser or
iii. overcoming optical bandwidth limitations of ring-resonator free-spectral range; or
iv. a reduction in the total output power required by the laser source (since each laser must generate fewer wavelengths); or v. reduced optical coupling loss between the laser and PIC; or vi. reduced accumulated loss due to bypass loss at each ring-resonator element (since fewer ring-resonator elements are coupled on an individual bus waveguide); or vii. an ability to design the passbands of each CWDM wavelength-channel band with a wider bandwidth than the sum of the DWDM wavelength-channels/spacing within the band, thereby providing drift tolerance for the laser source and modulators (due either to fabrication imperfections or temperature change); or viii. the use of wider CWDM wavelength-channel bands to avoid a need for filters having very narrow spectral shapes as interleavers and de-interleavers for multiplexing every other adjacent wavelength channel; or ix. any combination of i, ii, iii, iv, v, vi, vii, and viii.

Returning now to FIG. 1, TX cores 108-1 through 108-N provide wavelength-channel bands WCB-1 through WCB-N to MUX 110 via coupling waveguides 112, where the light signals containing the wavelength-channel bands are combined to produce composite DWDM output signal 116. As a result, DWDM output signal 116 includes N*M wavelength channels.

In a conventional telecom or datacom system, DWDM output signal 116 is typically coupled into a transmission optical fiber at output port 114; however, in some embodiments, DWDM output signal 116 is coupled into a different element, such as another PIC, a planar-lightwave circuit, etc.

MUX 110 is an optical element having input ports IP-1 through IP-N, each of which includes a different one of a plurality of coupling waveguides 112. The coupling waveguides are arranged in a cascaded network of asymmetric Mach-Zehnder Interferometer (aMZI) combiners, where the aMZI are configured to combine light signals carrying spectrally disparate wavelength-channel bands (i.e., the wavelength-channel bands are separated by more than the standard DWDM wavelength-channel spacing) to form DWDM output signal 116. Examples of multiplexers and demultiplexers suitable for use in accordance with the present disclosure are disclosed by F. Horst, et al., in "Cascaded Mach-Zehnder wavelength filters in silicon photonics for low loss and flat pass-band WDM (de-) multiplexing," *Optics Express, Vol.* 21, Issue 10, pp. 11652-11658 (2013), which is incorporated herein by reference. In some embodiments, MUX 110 is configured to combine wavelength-channel bands that are on the standard CWDM ITU grid.

It is an aspect of the present disclosure that, contrary to prior-art cascaded aMZI filters that are based on silicon-core waveguides, MUX 110 and/or DEMUX 122 are cascaded aMZI filters based on thin-core silicon nitride waveguides surrounded by relatively thick (e.g., 1 micron or more) silicon dioxide, whereby the majority of the optical mode exists in the silicon dioxide (e.g., coupling waveguide 112). In other words, the optical mode is only weakly confined to the silicon nitride core. Such waveguides have very high fabrication tolerance and low sensitivity to small variations due, for example, to lithography or etching errors. Furthermore, such waveguides have very low temperature sensitivity due to the low refractive index change of silicon dioxide versus temperature. In some embodiments, however, portions of aMZI filters comprise silicon waveguides in order to enable easier tuning of the filter via adjacent heaters (since silicon refractive index shifts faster when heated).

In some embodiments, MUX 110 and/or DEMUX 122 include elements other than cascaded AMZIs for CWDM filtering, such as ring assisted AMZI (RAAMZI), Echelle gratings, arrayed waveguide gratings, star couplers, contra-directional filters, and the like.

Typically, output port 114 includes a mode-field conversion portion that substantially matches the mode field of DWDM output signal 116 to the external element (e.g., an optical fiber) with which transceiver section 102 is coupled.

Receiver section 104 is a second PIC disposed on substrate 106 comprising input port 118, polarization separation/rotation (PSR) stage 120, demultiplexer (DEMUX) 122, receiver (RX) cores 124-1 through 124-N, and output 126.

It should be noted that receiver section 104 is configured to receive a DWDM input signal having random or substantially unpolarized light. As a result, as discussed below, receiver section 104 includes PSR 120 and demux 122 includes parallel demultiplexing architectures to provide polarization diversity. In some embodiments, however, receiver section 104 receives a DWDM input signal for which polarization diversity is not required. In such embodiments, PSR 120 is not required in receiver section 104 and demux 122 requires only a single coarse-demultiplexing architecture.

Receiver section 104 receives DWDM input signal 128 at input port 118, where DWDM input signal 128 includes wavelength-channel bands WCB-1 through WCB-N.

In a conventional telecom or datacom system, DWDM input signal 128 is typically received from a transmission optical fiber at input port 118; however, in some embodiments, DWDM input signal 128 is received from a different element, such as another PIC, a planar-lightwave circuit, etc. Preferably, input port 118 includes a mode-field conversion portion that substantially matches its mode field to the mode field of DWDM input signal 128 as provided by the external element (e.g., an optical fiber) with which receiver section 104 is coupled.

When DWDM input signal 128 is received from an element having a random polarization state, such as a conventional optical fiber, PSR 120 is optionally included in receiver section 104 to provide polarization diversity, whereby DWDM input signal 128 is split into a first light signal containing TE-polarized light and a second light signal containing TM-polarized light, which is then rotated to convert it such that it is also TE-polarized light. The two TE-polarized light signals are then provided to demux 122 as light signals 128A and 128B.

Demux 122 includes two parallel coarse-demultiplexing architectures, each of which separates the portion of the light signal it receives from PSR 120 into discrete wavelength-channel bands WCB-1A through WCB-NA and WCB-1B through WCB-NB. In some embodiments, each coarse-demultiplexing architecture is a cascaded network of aMZI elements that are analogous to the aMZI combiners included in MUX 110.

As a result, each of RX cores 124-1 through 124-N receives corresponding wavelength-bands WCB-iA and WCB-iB, where each RX core is configured to detect the combined optical power in the corresponding individual wavelength channels in the wavelength-channel bands.

Figure 3:
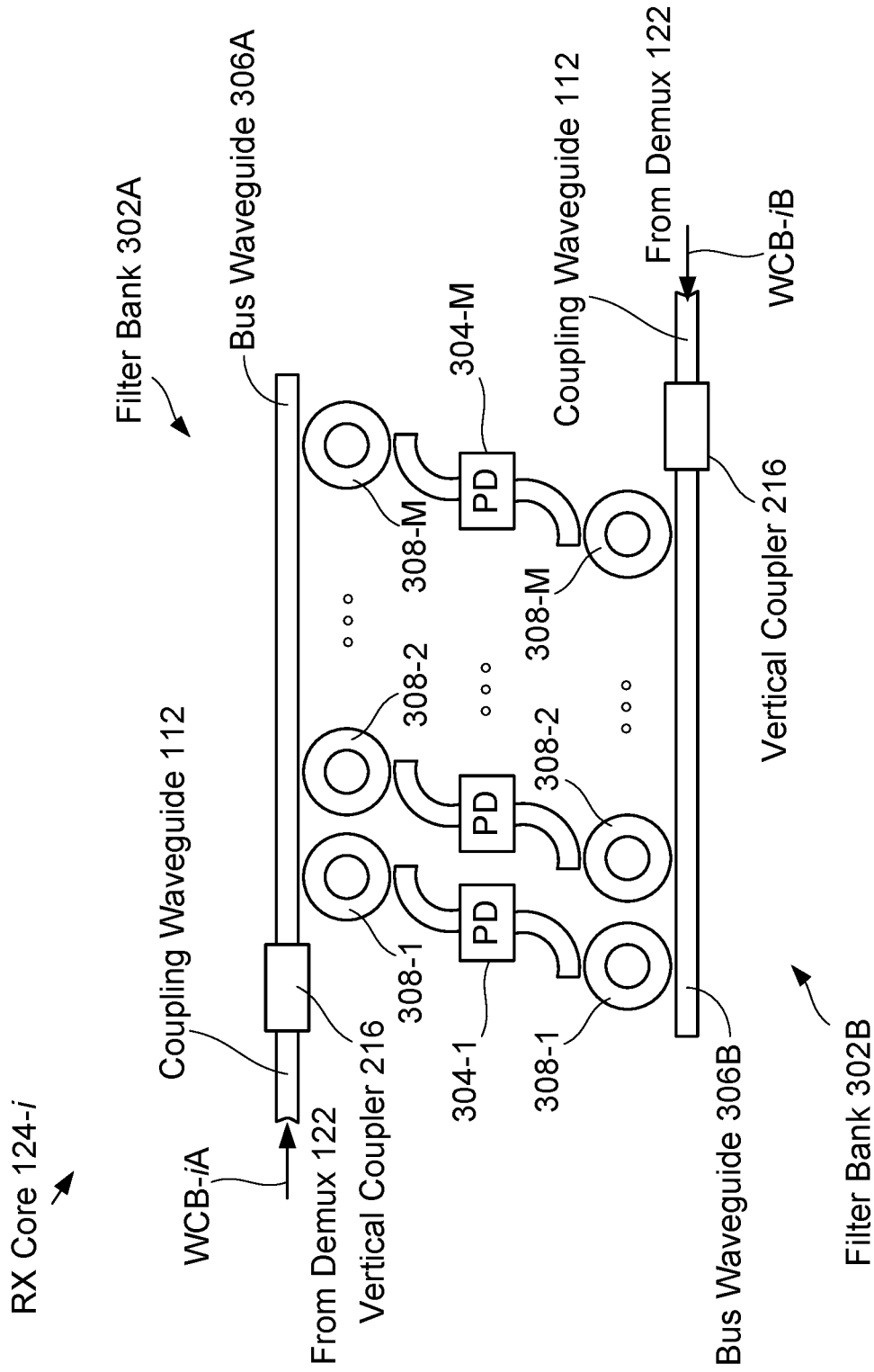
FIG. 3 depicts a schematic drawing of a representative receiver core in accordance with the present disclosure.

FIG. 3 depicts a schematic drawing of a representative receiver core in accordance with the present disclosure. RX core 124-*i* comprises spectral-filter banks 302A and 302B and photodetectors 304-1 through 304-M. RX core 124-*i* is representative of each of RX cores 124-1 through 124-N. As will be apparent to one skilled in the art, after reading this Specification, a typical RX core in accordance with the present disclosure includes additional components that enable its operation, such as analog-to-digital converters, digital-to-analog converters, clock circuitry, heater drivers, control circuitry, and the like; however, for clarity purposes, these are not shown in FIG. 3. Furthermore, in some embodiments, additional wavelength channels are included in RX core 124-$i$ for use in communicating additional signals, such as a clock, control signals, and the like.

Spectral-filter banks 302A and 302B include substantially identical bus waveguides 306A and 306B and substantially identical ring waveguides 308-1 through 308-M (referred to, collectively, as ring waveguides 308). Spectral-filter bank 302A receives wavelength-channel band WCB-iA and spectral-filter bank 302B receives wavelength-channel band WCB-iB.

Each of bus waveguides 306A and 306B is analogous to bus waveguide 206. Each of bus waveguides 306 is optically coupled with demux 122 via a coupling waveguide 112 and vertical coupler 216.

Ring waveguides 308 are analogous to ring waveguides 208; however, ring waveguides 308 do not include modulators. Typically, ring waveguides are tunable. Ring waveguides 308 are configured such that each selectively couples a different one of the wavelength channels in the wavelength-channel band it receives from bus waveguide 306 to its respective photodetector 304. It should be noted that, although each of the ring-resonator data modulators and ring-resonator spectral filters described above includes only one ring, in some embodiments, at least one such device includes two or more ring waveguides that are optically coupled such that they have a composite spectral shape that, for example, does not distort the data encoded on the optical wavelengths.

RX core 124-$i$ is configured such that corresponding ring waveguides of filter banks 302A and 302B are optically coupled with the same photodetector 304. In other words, ring waveguide 308-1 of each of filter banks 302A and 302B is optically coupled with photodetector 304-1, ring waveguide 308-2 of each of filter banks 302A and 302B is optically coupled with photodetector 304-2, and so on.

Photodetectors 304-1 through 304-M (referred to, collectively, as photodetectors 304) are conventional photodetectors operative for detecting any wavelength channel included in DWDM input signal 128 and provide electrical signals corresponding to the M wavelength channels in the wavelength-channel band received by RX core 124-$i$. As a result, RX cores 124-1 through 124-M collectively provide M*N electrical signals as electrical output 130 at output 126.

In some embodiments, each of filter banks 302A and 302B is optically coupled with a different set of photodetectors and the outputs of corresponding pairs of photodetectors are combined in the electrical domain.

A transceiver in accordance with the present disclosure can include any practical number of TX cores and RX cores; however, typically, a transceiver includes equal numbers of TX and RX cores.

Figure 4:
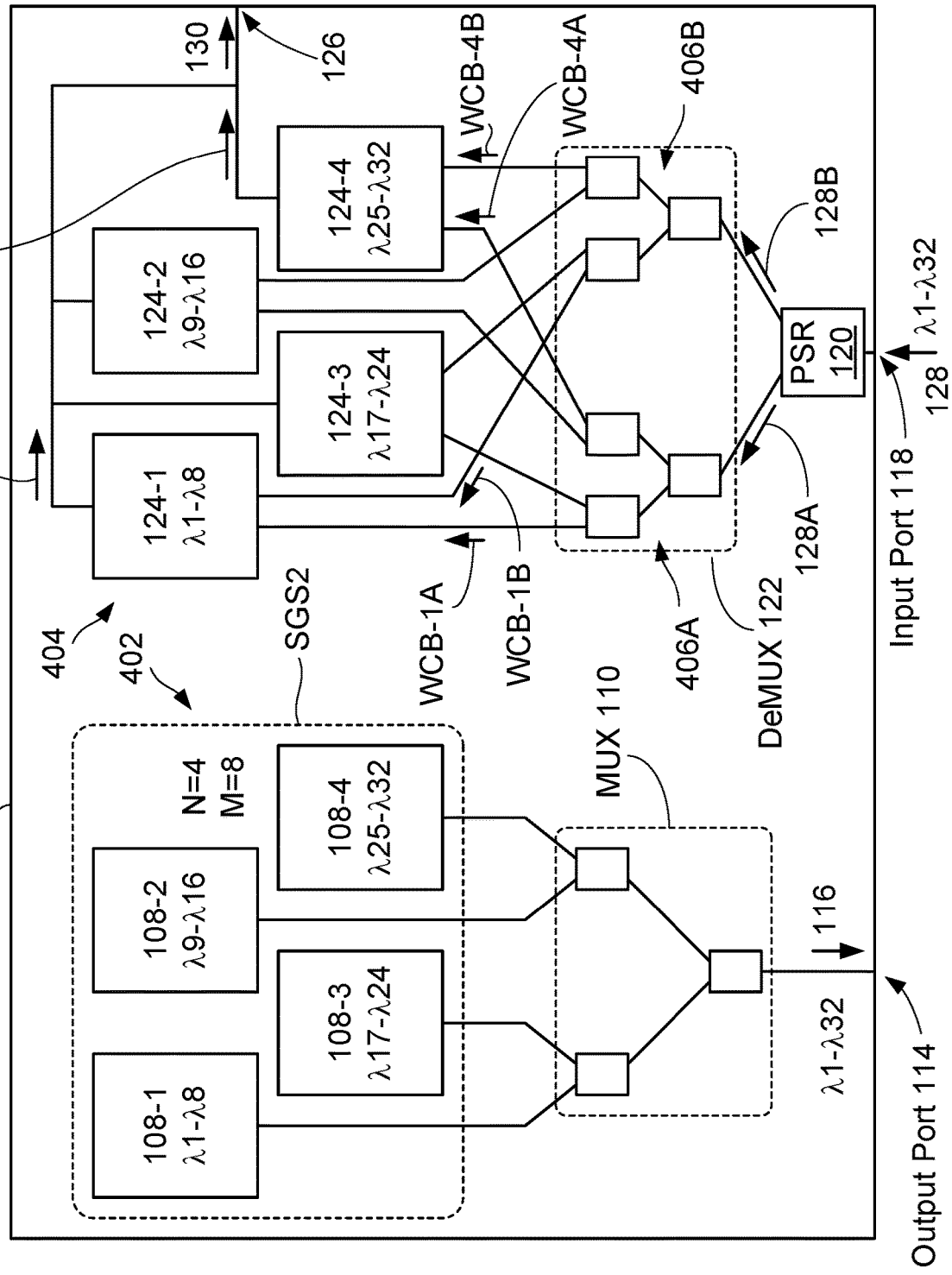
FIG. 4 depicts a schematic drawing of a first example of a transceiver design in accordance with the present disclosure.

FIG. 4 depicts a schematic drawing of a first example of a transceiver design in accordance with the present disclosure. Transceiver 400 comprises transmitter section 402 and receiver section 404. Transmitter section 402 and receiver section 404 are analogous to transmitter section 102 and receiver section 104 described above, with N=4 and M=8. In some embodiments, at least one of N and M has a different value.

Transmitter section 402 includes four TX cores 108 and MUX 110, where TX cores 108 collectively define a signal-generation stage (i.e., signal-generation stage SGS2). As discussed above and with respect to FIG. 1, signal-generation stage SGS2 provides a plurality of lights signals to MUX 110, where each light signal includes a different wavelength-channel band. At MUX 110, these light signals are multiplexed to produce DWDM output signal 116 at output port 114. In the depicted example, the output signal includes four CWDM wavelength-channel bands WCB-1 through WCB-4, which are separated by a center-to-center band spacing of 20 nm. Each wavelength-channel band contains eight DWDM wavelength channels having a channel spacing of 200 GHz. In the depicted example, the CWDM wavelength-channel bands are aligned with the standard CWDM ITU grid and the DWDM wavelength channels are aligned with the standard DWDM ITU grid. As a result, transmitter section 402 provides an aggregate output signal that is a 32-wavelength-channel DWDM output signal whose wavelength channels are aligned with the DWDM ITU grid.

MUX 110 is configured in two stages in which the first stage combines adjacent wavelength-channel bands and the second stage combines the two outputs of the first stage.

Receiver section 404 includes PSR 120, DEMUX 122, and four RX cores 124. Receiver section 404 is configured to receive DWDM input signal 128 at input port 118 and provide electrical output 130 such that it contains 32 independent electrical signals. In the depicted example, receiver section 404 is also configured to operate on an input signal that includes CWDM wavelength-channel bands WCB-1 through WCB-4, which are separated by 20 nm center-to-center, where each contains eight DWDM wavelength channels separated by 200 GHz. As in transmitter section 402, the CWDM wavelength-channel bands are aligned with the standard CWDM ITU grid and the DWDM wavelength channels are aligned with the standard DWDM ITU grid.

Receiver section 404 is an example of a receiver section configured to receive a DWDM signal having a random polarization state, as discussed above. As a result, DEMUX 122 includes parallel networks 406A and 406B, which separately demultiplex light portions 128A and 128B, respectively, received from PSR 120. In the depicted example, each of networks 406A and 406B includes a network of asymmetric Mach-Zehnder interferometers (aMZI); however, many alternative photonic devices can be used in networks 406A and 406B without departing from the scope of the present disclosure.

Each of RX cores 124-1 through 124-4 receives a pair of corresponding wavelength-channel bands from networks 406A and 406B and provides eight electrical signals based upon the combined optical power of the corresponding wavelength channels within the pair of wavelength-channel bands it receives.

For example, RX core 124-1 receives wavelength-channel bands WCB-1A and WCB-1B and provides electrical signals 408-1 through 408-8, where electrical signal 408-1 is based on the combination of wavelength channel λ1 in both of wavelength-channel bands WCB-1A and WCB-1B, electrical signal 408-2 is based on the combination of wavelength channel λ2 in both of wavelength-channel bands WCB-1A and WCB-1B, and so on.

In similar fashion, RX core 124-2 receives wavelength-channel bands WCB-2A and WCB-2B and provides electrical signals 408-9 through 408-16, where electrical signal 408-9 is based on the combination of wavelength channel λ9 in both of wavelength-channel bands WCB-2A and WCB-2B, electrical signal 408-10 is based on the combination of wavelength channel λ10 in both of wavelength-channel bands WCB-2A and WCB-2B, and so on.

Electrical signals 408-1 through 408-32 from RX cores 124-1 through 124-4 collectively define electrical output 130, which is provided at output 126.

Figure 5:
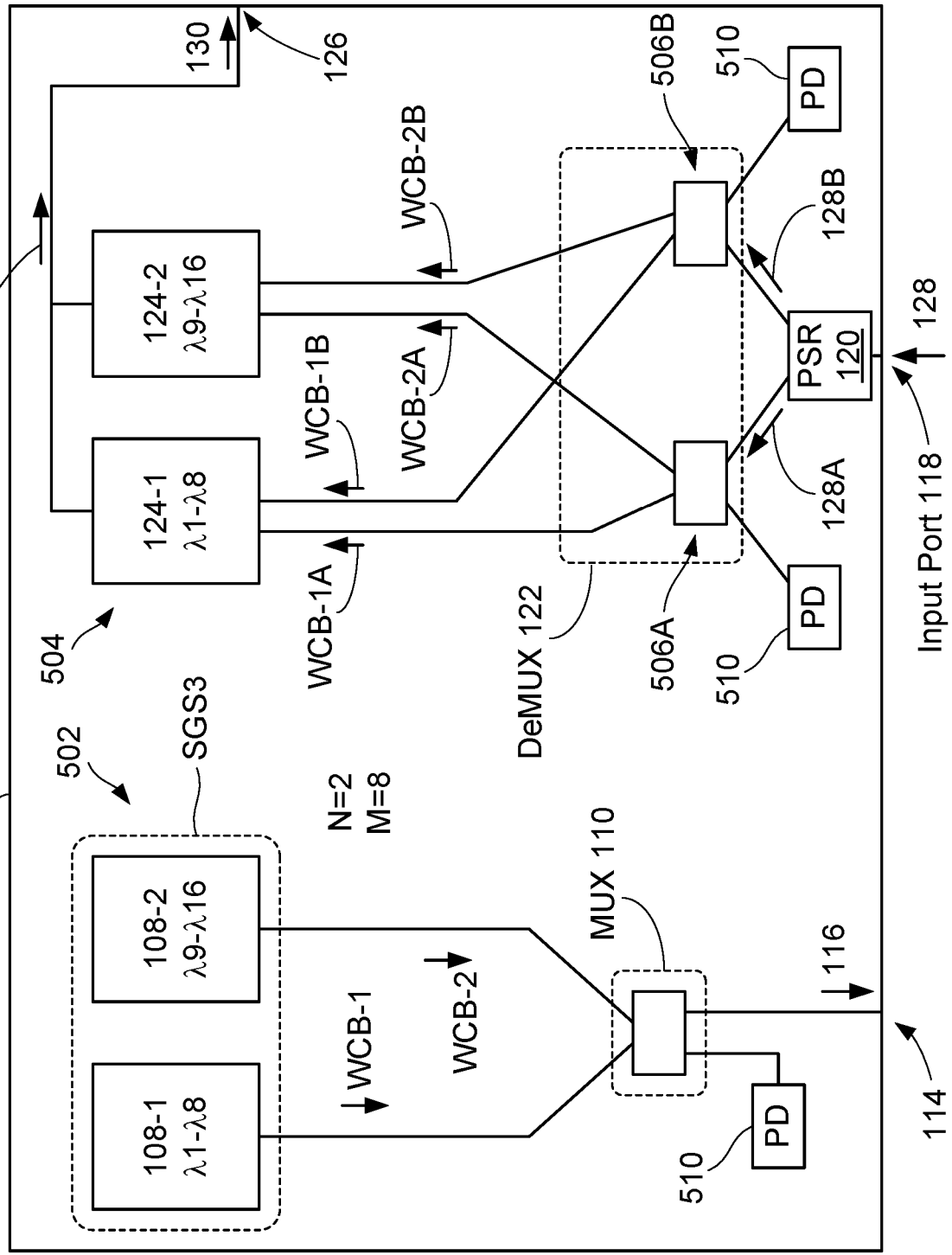
FIG. 5 depicts a schematic drawing of a first example of a transceiver in accordance with the present disclosure.

FIG. 5 depicts a schematic drawing of a second example of a transceiver in accordance with the present disclosure. Transceiver 500 comprises transmitter section 502 and receiver section 504. Transmitter section 502 and receiver section 504 are analogous to transmitter section 102 and receiver section 104 described above, with N=2 and M=8. In some embodiments at least one of N and M has a different value.

Transmitter section 502 includes two TX cores 108 and MUX 110, where TX cores 108 collectively define a signal-generation stage (i.e., signal-generation stage SGS3). As discussed above and with respect to FIG. 1, signal-generation stage SGS3 provides a plurality of lights signals to MUX 110, where each light signal includes a different wavelength-channel band.

At MUX 110, the light signals provided by signal-generation stage SGS3 are combined to provide DWDM output signal 116 at output port 114.

In the depicted example, the output signal includes two CWDM wavelength-channel bands WCB-1 through WCB-2, each containing eight DWDM wavelength channels, where the CWDM wavelength-channel bands are aligned with the standard CWDM ITU grid and the DWDM wavelength channels are aligned with the standard DWDM ITU grid. As a result, transmitter section 502 provides an aggregate output signal that is a 16-wavelength-channel DWDM output signal whose wavelength channels are aligned with the DWDM ITU grid.

Receiver section 504 includes parallel networks 506A and 506B, which are aMZI-based networks configured to demultiplex light portions 128A and 128B, respectively, received from PSR 120. In the depicted example, each of networks 506A and 506B includes two stages of cascaded Mach Zehnder filters, which are arranged in the opposite order of those included in MUX 110.

It should be noted that, an aMZI element typically includes two output ports. As a result, in the depicted example, optional monitor photodiodes 510 are included at the otherwise unused port of each aMZI in MUX 110 and DEMUX 122 to, for example, enable control of aMZI alignment, measure back reflections arising in the PLC, and the like. In the depicted example, photodiodes 510 are formed at the same time as lasers 202 using analogous heterogeneous-integration methods. In some embodiments, photodiodes 510 are discrete detectors (e.g., III-V photodetectors, etc.) that are integrated using hybrid bonding techniques, or are formed as part of a silicon photonics wafer process (e.g. germanium photodetectors). In some embodiments monitor photodiodes are placed in other positions, such as at one or more outputs of the aMZIs and are either placed in line on the waveguide as a partially absorbing photodiode, or placed at the tap port of a tap in the waveguide which separates a small amount of the light signal for monitoring.

In some embodiments, an aMZI is controlled to minimize the power received by photodiode 510, thereby mitigating loss in the DWDM wavelengths passing through the CWDM mux filter. In some embodiments, a dither signal is applied at the ring-waveguide-based data modulators to the outer wavelength channels within each CWDM band so that these can be detected separately by the monitor PDs to ensure the CWDM mux filters are aligned properly. In some embodiments, dither signals are applied to the AMZI tuners in DEMUX 122 (or other CWDM demux elements) to differentiate detected signals at the photodiodes for control purposes. If dithering from the ring modulators that is imparted on each wavelength channel is used to control the receive ring alignments, the dither signals applied to the CWDM demux elements are preferably at a different frequency in order to differentiate the effects of ring demux tuning versus the CWDM demux tuning.

Each of RX cores 124-1 and 124-2 receives corresponding wavelength-channel bands from networks 506A and 506B on their respective bus waveguides. Each bus waveguide is optically coupled with a substantially identical set of eight ring resonators to define eight spectral filters that separate each of the individual 200 GHz spaced wavelengths and provide them to eight separate photodetectors. Corresponding spectral filters from each bus waveguide route the same wavelength channel to the same photodetector such that each photodetector provides a separate electrical signal that is based upon the combined optical power in the corresponding wavelength channels within the wavelength-channel band received at the RX core.

Specifically, RX core 124-1 receives wavelength-channel bands WCB-1A and WCB-1B and provides electrical signals 508-1 through 508-8, where electrical signal 508-1 is based on the combination of wavelength channel $\lambda 1$ in both of wavelength-channel bands WCB-1A and WCB-1B, electrical signal 508-2 is based on the combination of wavelength channel $\lambda 2$ in both of wavelength-channel bands WCB-1A and WCB-1B, and so on.

In similar fashion, RX core 124-2 receives wavelength-channel bands WCB-2A and WCB-2B and provides electrical signals 508-9 through 508-16, where electrical signal 508-9 is based on the combination of wavelength channel $\lambda 9$ in both of wavelength-channel bands WCB-2A and WCB-2B, electrical signal 508-10 is based on the combination of wavelength channel $\lambda 10$ in both of wavelength-channel bands WCB-2A and WCB-2B, and so on.

Electrical signals 508-1 through 508-16 collectively define electrical output 130, which is provided at output 126.

As will become apparent to one skilled in the art, the number of TX cores and/or RX cores included in systems, methods, and structures according to aspects of the present disclosure is a matter of design and is limited only by practical considerations associated with the application of these systems, methods, and structures.

It should be noted that all embodiments discussed thus far have a single DWDM output signal; however, it is another aspect of the present disclosure that multiple multiwavelength lasers can provide multiwavelength signals to a star coupler having a plurality of output ports. The star coupler combines the multiple multiwavelength signals into an aggregate multiwavelength signal whose optical energy (and, therefore, the optical energy of each of its wavelength components) is substantially evenly distributed to each output port of the star coupler to realize a plurality of aggregate multiwavelength signals.

Figure 6:
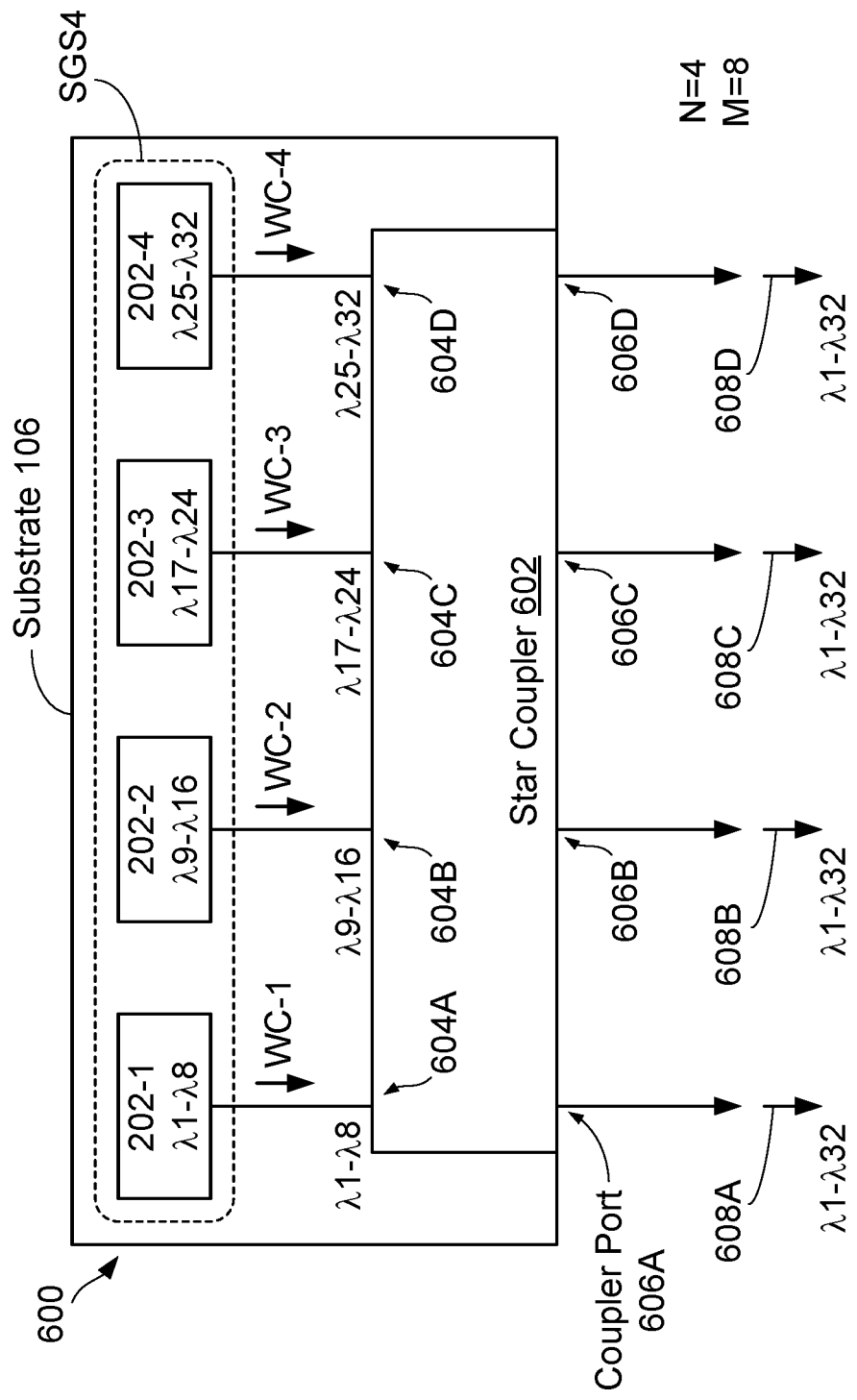
FIG. 6 depicts a schematic drawing of a transmitter section that functions as a multi-signal source in accordance with the present disclosure.

FIG. 6 depicts a schematic drawing of a transmitter section that functions as a multi-signal source in accordance with the present disclosure. Transmitter section 600 includes signal-generation stage SGS4 and star coupler 602, each of which is disposed on substrate 106.

Signal-generation stage SGS4 is configured as a multi-signal source and comprises multiwavelength lasers 202 (i.e., lasers 202-1 through 202-4) In the depicted example, signal-generation stage SGS4 provides four light signals carrying wavelength combs WC-1 through WC-4, respectively. In the depicted example, each of wavelength combs WC-1 through WC-4 includes eight DWDM wavelength channels. The wavelength combs are aligned with the standard CWDM ITU grid and the wavelength signals within them are aligned with the standard DWDM ITU grid.

Star coupler 602 is a conventional star coupler comprising four input ports 604A through 604D and four coupler ports 606A through 606D. As will be apparent to one skilled in the art, a conventional star coupler is an optical element that is configured such that optical energy of a light signal received at each input port is substantially equally distributed among the coupler ports.

In the depicted example, star coupler 602 is a PLC formed on substrate 106, wherein the PLC is configured such that its waveguides collectively define four input ports, four output ports, and a mixing region located between them. The mixing region is configured such that optical energy from each input port can propagate to every output port. In some embodiments, star coupler 602 has a different number of input and output ports. In some embodiments, star coupler 602 has unequal numbers of input and output ports. In some embodiments, star coupler 602 includes a different arrangement of elements/waveguides, such as one or more multimode interferometers, interconnecting waveguides, splitters, combiners, and the like. In some embodiments, splitters are included at one or more of coupler ports 606A through 606D to provide additional signal splitting. In some embodiments, star coupler 602 includes one or more optical fibers.

By virtue of the inclusion of star coupler 602, transmitter section 600 provides four aggregate output signals 608A through 608D, each of which is a 32-wavelength-channel DWDM signal whose wavelength channels are aligned with the DWDM ITU grid. Because the optical energy of each of wavelength combs WC-1 through WC-4 is equally distributed to coupler ports 606A through 606D, the intensity of each wavelength signal in output signals 608A through 608D is roughly one-quarter of their intensity in wavelength combs WC-1 through WC-4. It should be noted that, although transmitter section 600 includes 4 comb lasers (i.e., N=4), each of which provides 8 wavelengths (i.e., M=8), each of N and M can have any suitable value.

Figure 7:
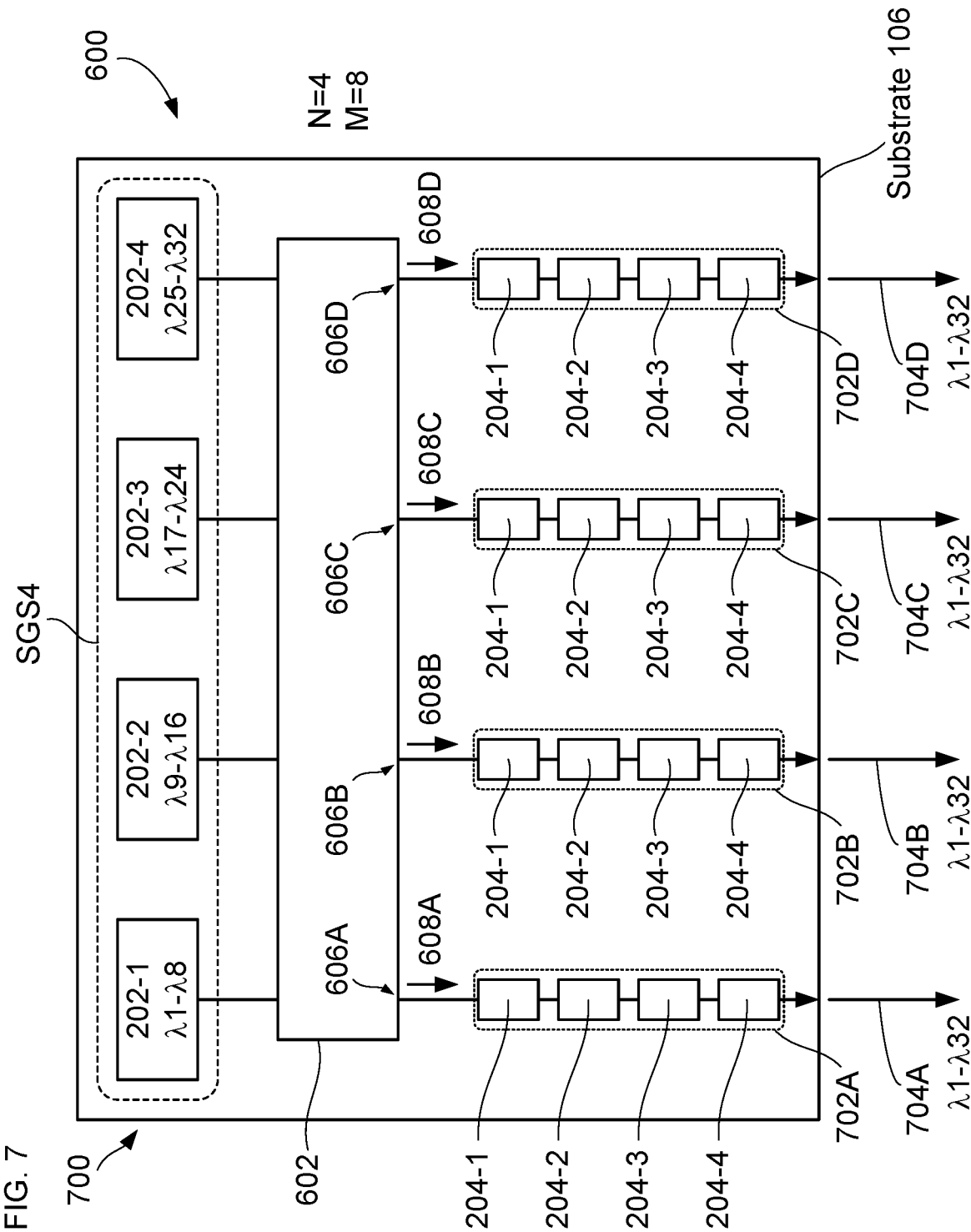
FIG. 7 depicts a schematic drawing of another example of a transmitter in accordance with the present disclosure.

FIG. 7 depicts a schematic drawing of another example of a transmitter in accordance with the present disclosure. Transmitter 700 comprises transmitter section 600 and modulator-bank arrays 702A through 702D, each of which is disposed on substrate 106.

As discussed above and with respect to FIG. 6, transmitter section 600 provides output signals 608A through 608D, which are conveyed to modulator-bank arrays 702A through 702D, respectively.

Each of modulator-bank arrays 702A through 702D includes a substantially identical serial arrangement of modulator banks 204-1 through 204-4, each of which includes a plurality of modulators that is operative for imprinting data on the wavelength signals of a different one of wavelength combs WC-1 through WC-4.

Modulator-bank arrays 702A through 702D provide DWDM output signals 704A through 704D, respectively, each of which is coupled into a different optical fiber (not shown); however, in some embodiments, at least one of the DWDM output signals from a transmitter is optically coupled into something other than an optical fiber, such as a photodetector, PIC, PLC, free space, and the like.

As will be apparent to one skilled in the art, a ring-resonator-based modulator can have a limited FSR. In addition, passing a wavelength comb through a large serial arrangement of ring-resonator-based modulators (i.e., 32 in the present example) can give rise to significant optical loss. In some embodiments, therefore, transmitters in accordance with the present disclosure include waveguide and modulator arrangements that mitigate these potential issues.

Figure 8:
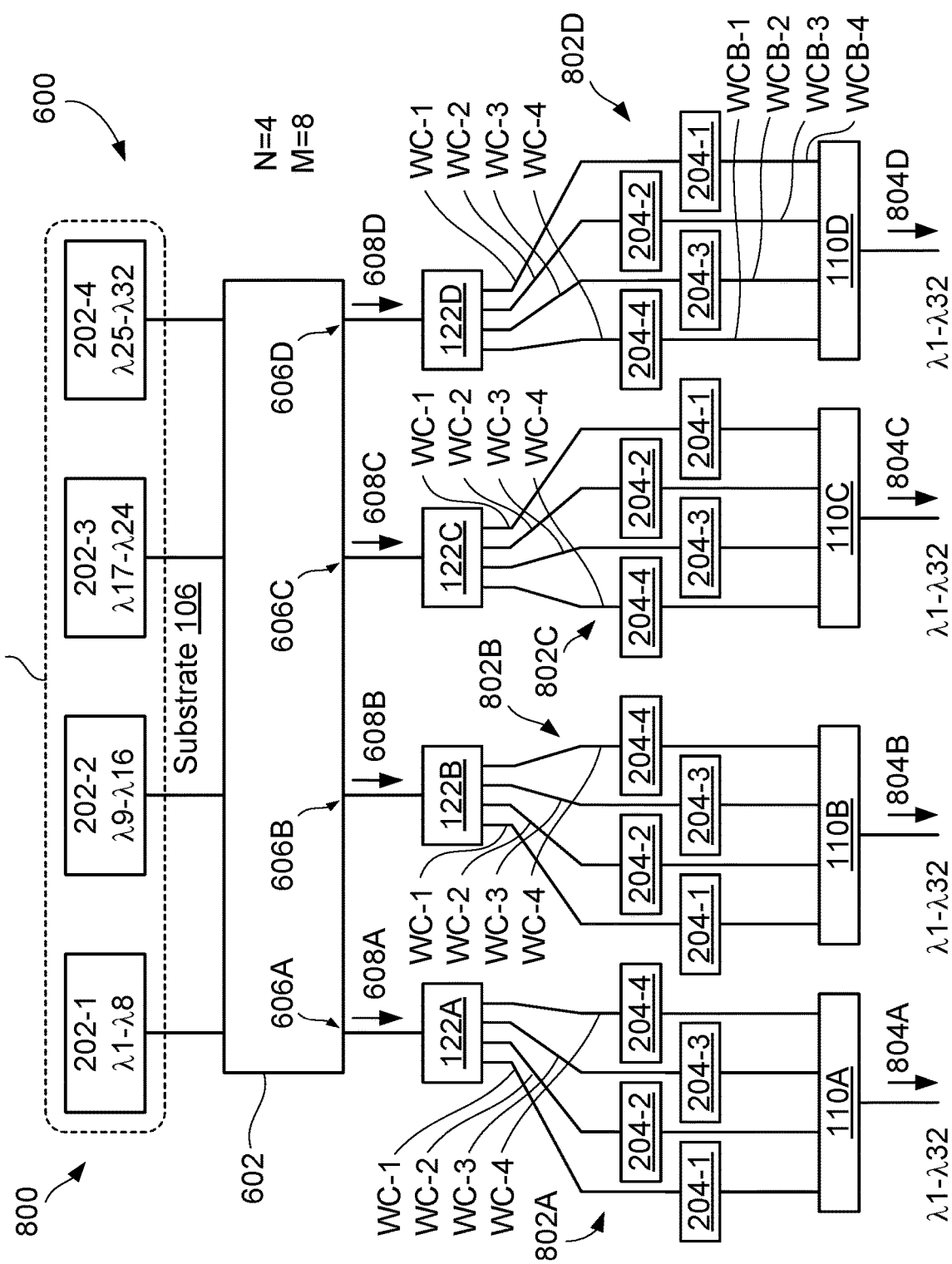
FIG. 8 depicts a schematic drawing of an alternative embodiment of a transmitter in accordance with the present disclosure.

FIG. 8 depicts a schematic drawing of an alternative embodiment of a transmitter in accordance with the present disclosure. Transmitter 800 includes transmitter section 600, demux 122A through 122D, modulator-bank arrays 802A through 802D, and MUX 110A through 110D, all of which are disposed on substrate 106.

Each of modulator-bank arrays 802A through 802D includes a substantially identical parallel arrangement of modulator banks 204-1 through 204-4.

Modulator-bank arrays 802A through 802D are optically coupled with coupler ports 606A through 606D via demux 122A through 122D, respectively. Each of demux 122A through 122D separates wavelength combs WC-1 through WC-4 in the aggregate output signal it receives and couples it into a different waveguide. Each of wavelength combs WC-1 through WC-4 is then individually conveyed to a different one of modulator banks 204-1 through 204-4, which imprints data on the wavelength combs to provide wavelength-channel bands WCB-1 through WCB-4.

For instance, in the depicted example: aggregate output signal 608A is demultiplexed at demux 122A such that WC-1 is received by modulator bank 204-1 of modulator-bank array 802A, WC-2 is received by modulator bank 204-2 of modulator-bank array 802A, WC-3 is received by modulator bank 204-3 of modulator-bank array 802A, and WC-4 is received by modulator bank 204-4 of modulator-bank array 802A; aggregate output signal 608B is demultiplexed at demux 122B such that WC-1 is received by modulator bank 204-1 of modulator-bank array 802B, WC-2 is received by modulator bank 204-2 of modulator-bank array 802B, WC-3 is received by modulator bank 204-3 of modulator-bank array 802B, and WC-4 is received by modulator bank 204-4 of modulator-bank array 802B; and so on.

Modulator-bank arrays 802A through 802D are optically coupled with mux 110A through 110D, each of which combines the wavelength-channel bands provided by its respective modulator-bank array into an aggregate DWDM output signal—specifically, DWDM output signals 804A through 804D.

Each of DWDM output signals 804A through 804D is coupled into a different optical fiber (not shown); however, in some embodiments, at least one of the DWDM output signals from a transmitter is optically coupled into something other than an optical fiber, such as a photodetector, PIC, PLC, free space, and the like.

In some embodiments, one or more semiconductor optical amplifiers (SOA) are included in a transmitter to mitigate optical loss in the system. For example, in some embodiments, an SOA is included at each output of DEMUX 122A through 122D to increase the intensity of the wavelength signals in the wavelength combs provided to modulator-bank arrays 802A through 802D. Although SOA can be used elsewhere in a transmitter configuration, locating SOA prior to each MUX 110A-110D avoids the need for SOA having very wide spectral bandwidth.

Figure 9:
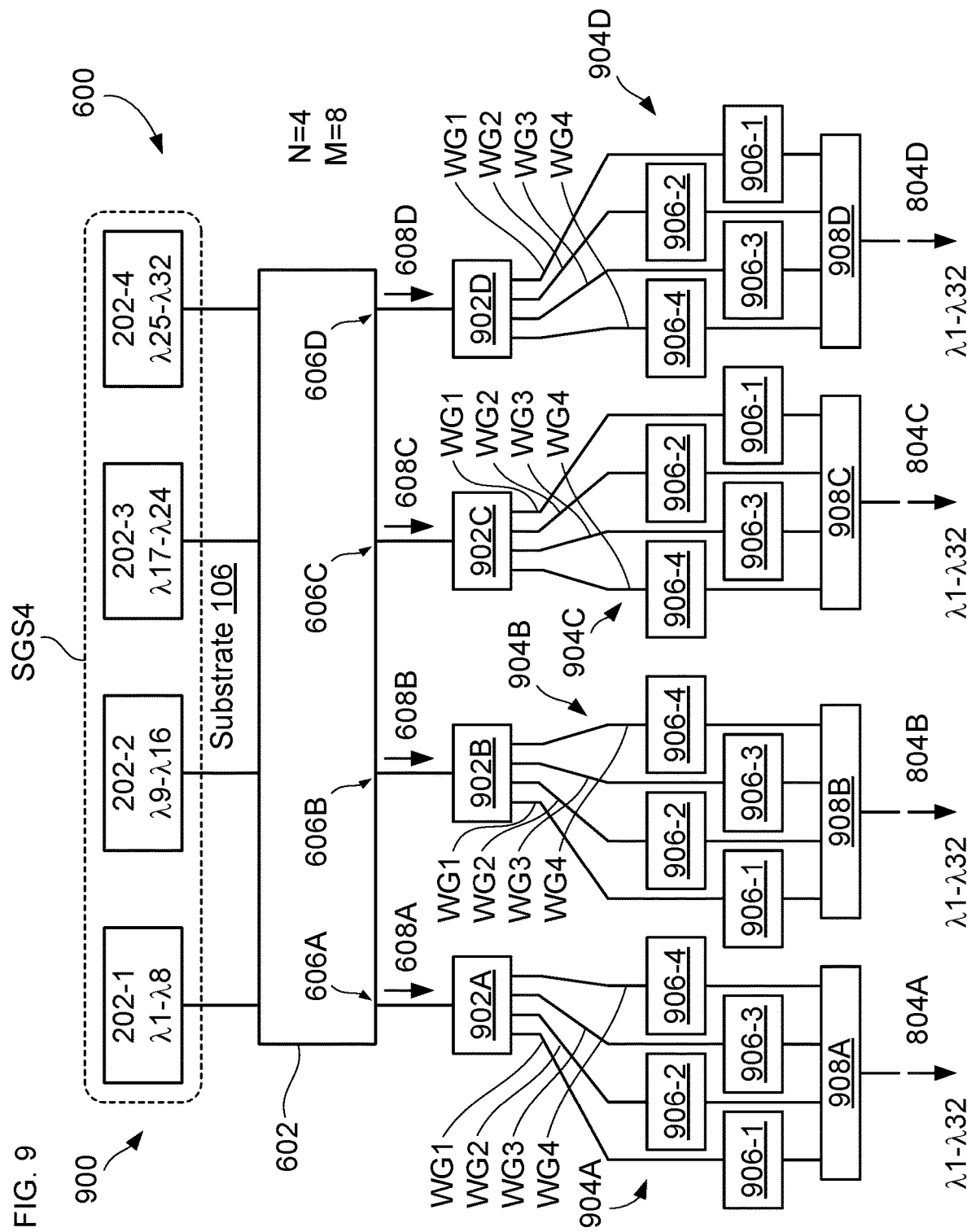
FIG. 9 depicts a schematic drawing of another alternative embodiment of a transmitter in accordance with the present disclosure.

FIG. 9 depicts a schematic drawing of another alternative embodiment of a transmitter in accordance with the present disclosure. Transmitter 900 includes transmitter section 600, de-interlevers 902A through 902D, modulator-bank arrays 904A through 904D, and interlevers 908A through 908D.

The arrangement of transmitter 900 is analogous to that of transmitter 800; however, in transmitter 900, the demultiplexers are replaced by even-odd de-interleavers and the multiplexers are replaced by even-odd interleavers. In other words, demux 122A-122D are replaced by even-odd de-interleavers 902A-902D, respectively, and mux 110 are replaced by even-odd interleavers 908A-908D, respectively.

Modulator-bank arrays 904A-904D are analogous to modulator-bank arrays 802A-802D; however, modulator-bank arrays 904A-904D are configured to modulate the wavelength signals provided them by de-interleavers 902A-902D.

As will be apparent to one skilled in the art, the wavelengths provided by an even-odd de-interleaver have spectral separation that is different from the wavelength signals provided by a comb laser. As a result, while they are analogous to the modulators of modulator banks 204A-204D, the individual modulators included in modulator banks 904A-904D are arranged differently to accommodate the set of wavelength signals each receives from its respective de-interleaver.

In the depicted example, each of de-interleavers 902A-902D is a conventional wavelength de-interleaver having two stages of even-odd de-interleaving.

Each of interleavers 908A-908D is a conventional wavelength interleaver configured to reverse the operation of de-interleavers 904A-904D after the wavelength signals of wavelength-signal groups WG1 through WG4 have been modulated by modulator-bank arrays 904A-904D. Interleavers 908A-908D provide DWDM output signals 804A through 804D, respectively.

Each of DWDM output signals 804A through 804D is coupled into a different optical fiber (not shown); however, in some embodiments, at least one of the DWDM output signals from a transmitter is optically coupled into something other than an optical fiber, such as a photodetector, PIC, PLC, free space, and the like.

In some embodiments, lasers 202A-202D, de-interleavers 902A-902D, and interleavers 908A-908D are synchronized by control signals provided by a system controller (not shown).

It is to be understood that the disclosure teaches just some examples of embodiments in accordance with the present disclosure and that many variations of the invention can easily be devised by those skilled in the art after reading this disclosure and that the scope of the present invention is to be determined by the following claims.

What is claimed is:

1. An apparatus comprising first photonic-integrated circuit (PIC) comprising a transmitter section disposed on a first substrate, the transmitter section including:
    a plurality of lasers, each laser being a multiwavelength laser configured to produce at least one wavelength comb of a first plurality of wavelength combs, each wavelength comb of the first plurality thereof encompassing a different spectral range and including a plurality of wavelength signals that are separated by a first wavelength spacing, wherein the wavelength combs of the first plurality thereof are separated by a second wavelength spacing that is greater than the first wavelength spacing; and
    a star coupler having a plurality of input ports and a plurality of coupler ports;
    wherein the plurality of lasers and the plurality of input ports are optically coupled via a plurality of waveguides such that each input port of the plurality thereof receives a different wavelength comb of the first plurality thereof; and
    wherein the star coupler distributes each wavelength comb of the first plurality thereof equally among the plurality of coupler ports to define a plurality of composite output signals, each composite output signal including a substantially equal portion of the optical energy of each of the wavelength signals of each of the first plurality of wavelength combs.

2. The apparatus of claim 1 wherein a first laser of the plurality thereof is configured to provide a first wavelength signal in addition to the plurality of wavelength signals of its respective wavelength comb, and wherein each composite output signal includes an equal portion of the first wavelength signal.

3. The apparatus of claim 1 further comprising a first amplifier that is optically coupled with a first coupler port of the plurality thereof.

4. The apparatus of claim 1 wherein the plurality of wavelength signals in each wavelength comb of the first plurality thereof is aligned with a standard dense-wavelength-division multiplexing (DWDM) international telecommunication union (ITU) grid.

5. The apparatus of claim 1 wherein the first plurality of wavelength combs is aligned with a coarse-wavelength-division multiplexing (CWDM) ITU grid.

6. The apparatus of claim 1 wherein at least two wavelength combs of the plurality thereof include an unequal number of wavelength signals.

7. The apparatus of claim 1 wherein the transmitter section further includes a plurality of modulator-bank arrays, each modulator-bank array being optically coupled with a different coupler port of the plurality thereof such that each modulator-bank array receives a different composite output signal of the plurality thereof, and wherein each modulator-bank array includes a plurality of modulator banks, each modulator bank being configured to encode data on each wavelength signal of a different wavelength comb of the plurality thereof to produce a different wavelength-channel band of a plurality thereof.

8. The apparatus of claim 7 wherein each wavelength-channel band of the plurality of wavelength-channel bands has a corresponding spectral range, and wherein, for each modulator bank of the plurality thereof, each of its plurality of modulators is characterized by a free-spectral range that gives rise only to repeat modes located outside the corresponding spectral range of its respective wavelength-channel band.

9. The apparatus of claim 7 wherein each of the plurality of modulator banks in each modulator-bank array of the plurality thereof comprises:
    a bus waveguide configured to convey at least one wavelength comb of the first plurality thereof; and
    a plurality of modulators, each modulator being a ring-resonator-based modulator that is configured to encode data on a different wavelength signal in a first wavelength comb of the at least one wavelength comb conveyed by its respective bus waveguide.

10. The apparatus of claim 7 wherein the transmitter section further includes:
    a plurality of demultiplexers, each demultiplexer being optically coupled between a different coupler port of the plurality thereof and a different modulator bank array of the plurality thereof, and wherein each demultiplexer is configured to separate the wavelength combs of the composite output signal received from its respective coupler port and provide each separated wavelength comb to a different modulator bank of its respective modulator bank array; and
    a plurality of multiplexers, each multiplexer being optically coupled with a different modulator bank array, wherein each multiplexer is configured to combine the plurality of wavelength-channel bands produced by its respective modulator bank array into a different aggregate output signal of a plurality thereof.

11. The apparatus of claim 10 wherein at least one multiplexer of the plurality thereof comprises at least one contra-directional coupler configured for combining at least two wavelength-channel bands produced by its respective modulator bank array.

12. The apparatus of claim 10 further comprising a plurality of amplifiers, each amplifier being optically coupled between a first demultiplexer of the plurality thereof and a different modulator bank of its respective modulator bank array.

13. The apparatus of claim 10 wherein at least one demultiplexer of the plurality thereof comprises at least one contra-directional coupler configured for separating at least two wavelength-channel bands of the second plurality thereof.

14. The apparatus of claim 1 wherein at least one laser of the plurality thereof is a heterogeneously integrated laser.

15. The apparatus of claim 1 wherein each waveguide of the plurality thereof has a core comprising silicon nitride and an upper cladding that comprises silicon dioxide, and wherein the core has a thickness within the range of approximately 40 nm to approximately 800 nm, and further wherein each of the upper cladding has a thickness within the range of approximately 200 nm to approximately 15000 nm.

16. The apparatus of claim 15 wherein the core has a thickness within the range of approximately 110 nm to approximately 250 nm, and further wherein each of the upper cladding has a thickness within the range of approximately 1000 nm to approximately 5000 nm.

17. The apparatus of claim 1 wherein at least one laser of the plurality thereof is a quantum-dot laser.

18. A method comprising:
providing a first substrate comprising;
a plurality of waveguides;
a star coupler having a first plurality of input ports and a plurality of coupler ports; and
a plurality of lasers, wherein each laser is a multiwavelength laser that is optically coupled with a different input port of the plurality thereof via a different waveguide of the plurality thereof, and wherein each laser is configured to provide at least one wavelength comb of a first plurality of wavelength combs, each wavelength comb of the first plurality thereof encompassing a different spectral range and including a plurality of wavelength signals that are separated by a first wavelength spacing, wherein the wavelength combs of the first plurality thereof are separated by a second wavelength spacing that is greater than the first wavelength spacing; and
producing a plurality of composite output signals at the plurality of coupler ports, each composite output signal including a substantially equal portion of the optical energy of each wavelength signal included in each of the first plurality of wavelength combs.

19. The method of claim 18 wherein the first substrate is provided such that at least one laser of the plurality thereof is heterogeneously integrated on the first substrate.

20. The method of claim 18 wherein the first substrate is provided such that at least one laser of the plurality thereof is bonded onto the first substrate, and wherein the at least one laser is bonded on the first substrate via a method selected from the group consisting of die-to-wafer bonding, transfer printing, and flip-chip bonding.

21. The method of claim 18 wherein the first substrate is provided such that it further comprises a plurality of modulator bank arrays, each modulator bank array being optically coupled with a different coupler port of the plurality thereof and including a plurality of modulator banks, each modulator bank being configured to encode data on each wavelength signal of a different wavelength comb of the plurality thereof to produce a different wavelength-channel band of a plurality thereof.

22. The method of claim 21 wherein each modulator bank of the plurality thereof is provided such that it comprises:
a bus waveguide configured to convey a different wavelength comb of the first plurality thereof; and
a plurality of modulators, each modulator being a ring-resonator-based modulator that is configured to encode data on a different wavelength signal in the wavelength comb conveyed by its respective bus waveguide.

23. The method of claim 22 wherein each wavelength-channel band of the plurality of wavelength-channel bands has a corresponding spectral range, and wherein, for each modulator bank of the plurality thereof, each of its plurality of modulators is characterized by a free-spectral range that gives rise only to repeat modes located outside the corresponding spectral range of its respective wavelength-channel band.

24. The method of claim 21 wherein the first substrate is provided such that it further includes:
a plurality of demultiplexers, each demultiplexer being optically coupled between a different coupler port of the plurality thereof and a different modulator bank array of the plurality thereof; and
a plurality of multiplexers, each multiplexer being optically coupled with a different modulator bank array
and wherein the method further includes:
at each demultiplexer of the plurality thereof, separating the wavelength combs of the composite output signal produced at its respective coupler port and providing each of the separated wavelength combs to a different modulator bank of its respective modulator bank array; and
at each multiplexer of the plurality thereof, combining the plurality of wavelength-channel bands produced by its respective modulator bank array into a different aggregate output signal of a plurality thereof.

25. The method of claim 24 wherein the first substrate is provided such that at least one demultiplexer of the plurality thereof comprises at least one contra-directional coupler configured for separating at least two wavelength combs of the composite output signal received from its respective coupler port.

26. The method of claim 24 wherein the first substrate is provided such that it further includes a plurality of amplifiers, each amplifier being optically coupled between a first demultiplexer of the plurality thereof and a different modulator bank of its respective modulator bank array.

27. The method of claim 24 wherein the first substrate is provided such that at least one multiplexer of the plurality thereof comprises at least one contra-directional coupler configured for combining at least two of the wavelength-channel bands of the plurality thereof produced by its respective modulator bank array.

28. The method of claim 18 wherein the first substrate is provided such that at least two wavelength combs of the plurality thereof include an unequal number of wavelength signals.

29. The method of claim 18 wherein the first substrate is provided such that it includes an amplifier that is optically coupled with a first coupler port of the plurality thereof.

30. The method of claim 18 wherein the first substrate is provided such that at least one waveguide of the plurality thereof has a core comprising silicon nitride and an upper cladding comprising silicon dioxide, wherein the core has a thickness within the range of approximately 40 nm to approximately 800 nm, and wherein the upper cladding has a thickness within the range of approximately 200 nm to approximately 15000 nm.

31. The method of claim 30 wherein the core has a thickness within the range of approximately 110 nm to approximately 250 nm, and further wherein each of the upper cladding has a thickness within the range of approximately 1000 nm to approximately 5000 nm.

32. The method of claim 18 wherein the first substrate is provided such that the plurality of wavelength signals in each wavelength comb of the first plurality thereof is aligned with a standard dense-wavelength-division multiplexing (DWDM) international telecommunication union (ITU) grid.

33. The method of claim 18 wherein the first substrate is provided such that the first plurality of wavelength combs is aligned with a coarse-wavelength-division multiplexing (CWDM) ITU grid.

34. The method of claim 18 wherein the first substrate is provided such that at least one laser of the plurality thereof is a quantum-dot laser.

* * * * *